US012574676B2

(12) United States Patent
Park et al.

(10) Patent No.: US 12,574,676 B2
(45) Date of Patent: Mar. 10, 2026

(54) AUDIO DATA PROCESSING METHOD AND ELECTRONIC DEVICE SUPPORTING SAME

(71) Applicant: Samsung Electronics Co., Ltd., Suwon-si (KR)

(72) Inventors: Junseok Park, Suwon-si (KR); Kyumin Kim, Suwon-si (KR); Min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 203 days.

(21) Appl. No.: 18/466,318

(22) Filed: Sep. 13, 2023

(65) Prior Publication Data

US 2023/0421946 A1 Dec. 28, 2023

Related U.S. Application Data

(63) Continuation of application No. PCT/KR2022/001105, filed on Jan. 21, 2022.

(30) Foreign Application Priority Data

Mar. 23, 2021 (KR) ........................ 10-2021-0037206

(51) Int. Cl.
*H04R 3/04* (2006.01)
*H04R 1/10* (2006.01)

(52) U.S. Cl.
CPC ............. *H04R 1/1083* (2013.01); *H04R 3/04* (2013.01)

(58) Field of Classification Search
CPC .......... H04R 1/1083; H04R 3/04; H04R 3/02; H04R 2420/07; H04R 3/002; H04R 1/225;

(Continued)

(56) References Cited

U.S. PATENT DOCUMENTS

| | | | |
|---|---|---|---|
| 8,792,648 B2 | 7/2014 | Kim et al. | |
| 9,521,264 B2 | 12/2016 | Ahgren | |

(Continued)

FOREIGN PATENT DOCUMENTS

| | | | | |
|---|---|---|---|---|
| EP | 2868117 B1 * | 11/2017 | ............... H04B 3/20 |
| JP | 2011-066668 A | 3/2011 | |

(Continued)

OTHER PUBLICATIONS

International Search Report with Written Opinion and English translation dated May 16, 2022; International Appln. No. PCT/KR2022/001105.

(Continued)

*Primary Examiner* — Carolyn R Edwards
*Assistant Examiner* — Friedrich Fahnert
(74) *Attorney, Agent, or Firm* — Jefferson IP Law, LLP

(57) ABSTRACT

An electronic device comprising a wireless communication circuit, a microphone, an audio circuit, a processor, and a memory operatively connected to the processor are provided. When a designated application is executed, the electronic device transmits a trigger signal to the audio circuit, transmits the trigger signal to an external electronic device through the wireless communication circuit, acquires a response signal corresponding to the trigger signal by using the microphone from the external electronic device, calculates a path delay time by comparing the trigger signal with the response signal by using the audio circuit, and performs an echo canceling operation based on the path delay time.

20 Claims, 8 Drawing Sheets

(58) Field of Classification Search
CPC .......... H04R 2227/001; H04R 2460/01; G10L 2021/02082; G10L 21/0208; G06F 3/165
USPC .......................................................... 381/71.1
See application file for complete search history.

(56) References Cited

U.S. PATENT DOCUMENTS

| | | | | |
|---|---|---|---|---|
| 9,680,999 | B2 | 6/2017 | Jang | |
| 9,748,913 | B2 | 8/2017 | Kim et al. | |
| 10,650,840 | B1 * | 5/2020 | Solbach | G10L 21/0224 |
| 10,972,521 | B2 | 4/2021 | Paxinos et al. | |
| 11,323,807 | B2 | 5/2022 | Li et al. | |
| 11,361,785 | B2 | 6/2022 | Shim et al. | |
| 2008/0080702 | A1 | 4/2008 | Zhang et al. | |
| 2012/0154512 | A1 | 6/2012 | Takao et al. | |
| 2012/0155657 | A1 | 6/2012 | Takao et al. | |
| 2015/0078564 | A1 * | 3/2015 | Guo | G10L 21/0208 381/66 |
| 2018/0070290 | A1 * | 3/2018 | Breaux | G06F 9/546 |
| 2019/0103899 | A1 * | 4/2019 | Lee | G06F 1/1698 |
| 2021/0227010 | A1 | 7/2021 | Paxinos et al. | |
| 2022/0005490 | A1 | 1/2022 | Jin et al. | |

FOREIGN PATENT DOCUMENTS

| | | | |
|---|---|---|---|
| JP | 2014-230136 | A | 12/2014 |
| JP | 5800879 | B2 | 10/2015 |
| JP | 5877351 | B2 | 3/2016 |
| KR | 10-0400214 | B1 | 11/2003 |
| KR | 10-0892095 | B1 | 4/2009 |
| KR | 10-2009-0102100 | A | 9/2009 |
| KR | 10-2015-0002784 | A | 1/2015 |
| KR | 10-1583715 | B1 | 1/2016 |
| KR | 10-2069506 | B1 | 1/2020 |
| KR | 10-2020-0043128 | A | 4/2020 |
| KR | 10-2112018 | B1 | 5/2020 |
| KR | 10-2241289 | B1 | 4/2021 |

OTHER PUBLICATIONS

Korean Office Action dated Jul. 8, 2025, issued in a Korean Patent Application No. 10-2021-0037206.

* cited by examiner

AUDIO DATA PROCESSING METHOD AND ELECTRONIC DEVICE SUPPORTING SAME

CROSS-REFERENCE TO RELATED APPLICATION(S)

This application is a continuation application, claiming priority under § 365(c), of an International application No. PCT/KR2022/001105, filed on Jan. 21, 2022, which is based on and claims the benefit of a Korean patent application number 10-2021-0037206, filed on Mar. 23, 2021, in the Korean Intellectual Property Office, the disclosure of which is incorporated by reference herein in its entirety.

BACKGROUND

1. Field

The disclosure relates to a method for processing audio data and an electronic device supporting the same.

2. Description of Related Art

With a recent development of a mobile communication technology, an electronic device may perform a voice recognition function of controlling the device by recognizing a voice of a user and/or a function (e.g., a video call or a video conference) of acquiring the user's voice and transmitting/receiving audio data corresponding to the voice to/from an external electronic device. The electronic device may acquire the audio data from outside (e.g., the user or the external electronic device) using at least one audio input device (e.g., a microphone) to perform the functions described above. In this regard, the audio data acquired by the electronic device may contain echo.

In the disclosure, the echo may be defined as audio data received from an external electronic device located in close proximity to the electronic device. For example, the electronic device may reacquire audio data output from an output module and/or an external electronic device connected to the electronic device via an input module. In this regard, the acquired audio data may be defined as echo data. Specifically, the electronic device may perform the video call function with a second external electronic device while operating at a location in close proximity to a first external electronic device among a plurality of external electronic devices. The electronic device may transmit various data (e.g., audio data or video data) received from the second external electronic device to the first external electronic device, and allow the first external electronic device to output the data and provide the data to the user. In this regard, the electronic device may acquire the audio data output from the first external electronic device via an input device, and such audio data may be referred to as the echo.

The electronic device may provide a function (e.g., echo cancellation and noise suppression (ECNS)) of reducing distortion of the audio data using beamforming and/or an echo cancellation/suppression technology in an environment with a noise. For example, in the above example, the electronic device may further include various types of echo canceling devices to remove the echo acquired from the external electronic device. For example, the electronic device may include an echo canceling device that removes the echo using a minimum variance distortionless response (MVDR) beamformer. In addition to the above example, the electronic device may remove the echo components using the various types of echo cancelling devices.

The above information is presented as background information only to assist with an understanding of the disclosure. No determination has been made, and no assertion is made, as to whether any of the above might be applicable as prior art with regard to the disclosure.

SUMMARY

When a plurality of electronic devices provide functions using audio data, it may be difficult to provide the functions smoothly because of echo data. For example, when the electronic device transmits the audio data to an adjacent external electronic device and the external electronic device outputs the received audio data, the electronic device may receive the output audio data as the echo data (or noise). When an echo phenomenon continues, it may be difficult for the electronic device to normally perform the functions (e.g., a video call function). As a result, a user may experience difficulties in communication because of the echo data in a process of making a video call.

For example, in a process in which the electronic device makes the video call with a second external electronic device among a plurality of external electronic devices, audio data and video data received from the second external electronic device may be transmitted to a first external electronic device. The user may receive the video call function via the first external electronic device while holding the electronic device. In this regard, the electronic device may acquire audio data output from the first external electronic device, and the audio data may act as an obstacle in processing the audio data.

Aspects of the disclosure are to address at least the above-mentioned problems and/or disadvantages and to provide at least the advantages described below. Accordingly, an aspect of the disclosure is to provide a method for processing audio data and an electronic device supporting the same.

Additional aspects will be set forth in part in the description which follows and, in part, will be apparent from the description, or may be learned by practice of the presented embodiments.

In accordance with an aspect of the disclosure, an electronic device is provided. The electronic device includes a wireless communication circuit, a microphone, an audio circuit, a processor, and a memory operatively connected to the processor. The memory stores instructions that, when executed, cause the processor to, in response to a specified application being executed, transmit a trigger signal to the audio circuit, transmit the trigger signal to an external electronic device via the wireless communication circuit, acquire, from the external electronic device using the microphone, a response signal corresponding to the trigger signal, compare the trigger signal and the acquired response signal to calculate an echo path delay by using the audio processor, and based on the echo path delay, perform an echo canceling operation.

In accordance with another aspect of the disclosure, a method for an electronic device to process audio data is provided. The method includes, in response to a specified application being executed, transmitting a trigger signal to an audio circuit, transmitting the trigger signal to an external electronic device via a wireless communication circuit, acquiring, from the external electronic device using a microphone, a response signal corresponding to the trigger signal, calculating an echo path delay by comparing the trigger signal and the acquired response signal by using the audio circuit, and based on the echo path delay, performing an echo canceling function.

The electronic device according to the embodiment disclosed in the disclosure may provide the optimized echo canceling function by periodically analyzing and processing the audio data transmitted and/or received between the plurality of electronic devices in the process of executing the function using the audio data.

The electronic device may acquire the accurate echo data by updating the path delay (e.g., the echo path delay) that occurs when the plurality of electronic devices are in communication. The electronic device may improve a quality of the audio data processing function (e.g., the video call function) provided to the user by efficiently and intuitively performing the echo canceling function.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications, of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Figure 1:
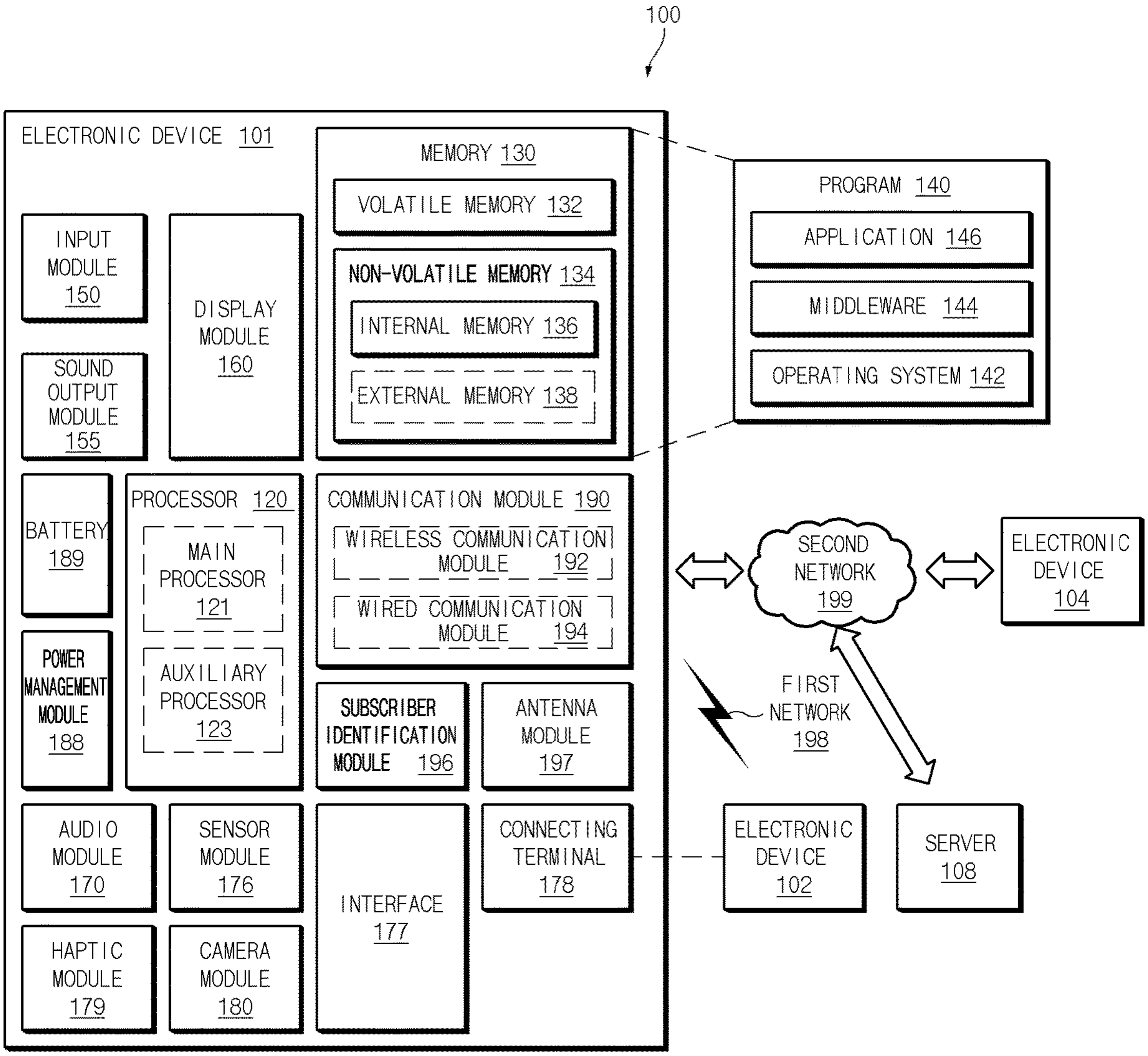
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g., electronic devices 102 and 104 or the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
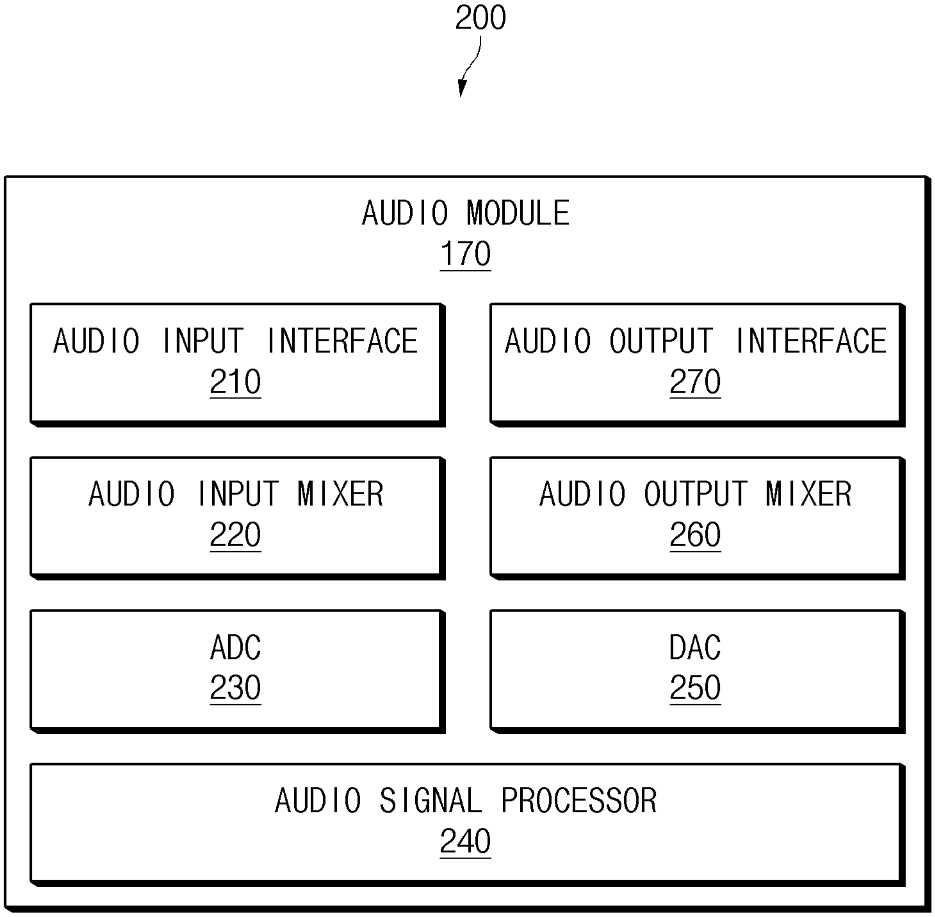
FIG. 2 is a block diagram illustrating an audio module according to an embodiment of the disclosure.

FIG. 2 is a block diagram illustrating an audio module according to an embodiment of the disclosure.

Referring to FIG. 2, block diagram 200 illustrates that an audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input module 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor 120 or the memory 130) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output module 155. The sound output module 155 may include, for example, a speaker, such as a dynamic driver or a balanced armature driver, or a receiver. According to an embodiment, the sound output module 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

Figure 3:
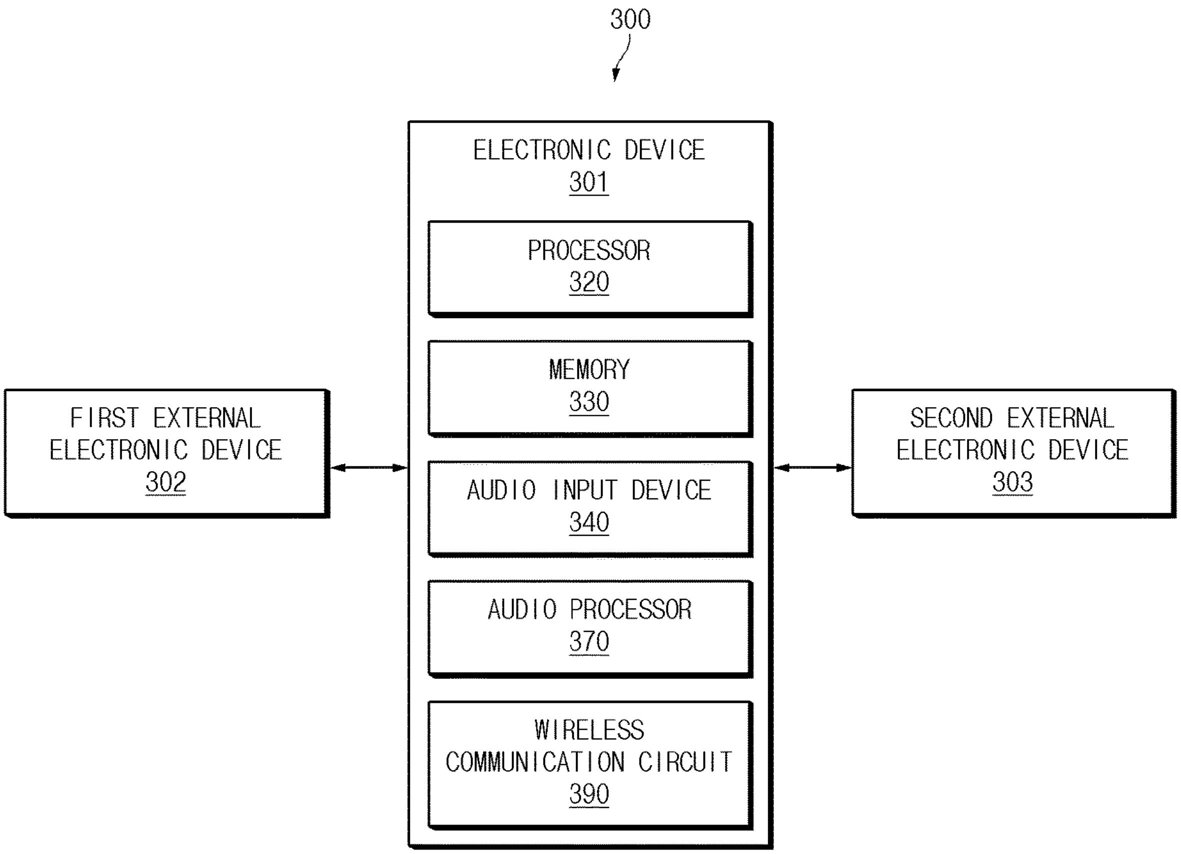
FIG. 3 shows a block diagram of components included in an electronic device according to an embodiment of the disclosure.

FIG. 3 shows a block diagram of components included in an electronic device according to an embodiment of the disclosure.

Referring to FIG. 3, according to one embodiment, block diagram 300 illustrates that an electronic device 301 (e.g., the electronic device 101 in FIG. 1) may include a processor 320 (e.g., the main processor 121 in FIG. 1), a memory 330 (e.g., the memory 130 in FIG. 1), an audio input device 340 (e.g., the input module 150 in FIG. 1), an audio processor 370 (e.g., the auxiliary processor 123 in FIG. 1 or the audio signal processor 240 in FIG. 2), and/or a wireless communication circuit 390 (e.g., the communication module 190 in FIG. 1). The configuration of the electronic device 301 shown in FIG. 3 is illustrative, and embodiments of the disclosure are not limited thereto. For example, it is shown that the audio processor 370 is implemented separately from the processor 320, but is able to be implemented as a portion of and/or to be included in the processor 320. For example, the audio processor 370 may be implemented as a separate processor (e.g., a digital signal processor (DSP)) distinct from the processor 320. As another example, the audio processor 370 may be included on the same application processor chip (AP chip) together with the processor 320 and may be referred to as a separate component (e.g., the DSP) specialized for a specific function (e.g., audio signal processing). As another example, the electronic device 301 may further include components (e.g., the display module 160, the sensor module 176, and/or the interface 177 in FIG. 1) not shown in FIG. 3.

According to one embodiment, a first external electronic device 302 (e.g., a television (TV)) may perform wireless communication (e.g., Wi-Fi communication and/or Bluetooth™ communication) with the electronic device 301. For example, the first external electronic device 302 may receive various data by performing the wireless communication with the electronic device 301. For example, the first external electronic device 302 may receive audio data received by the electronic device 301 from a second external electronic device 303 via a wireless communication circuit. The audio data received from the first external electronic device 302 may be referred to as utterance input data by a user of the second external electronic device 303. The electronic device 301 may receive utterance input data by the user of the second external electronic device 303 via the wireless communication circuit 390 and transmit the received data to the first external electronic device 302. The first external electronic device 302 may externally output the received utterance input data by the user of the second external electronic device 303 using an output module (e.g., a speaker). The electronic device 301 may acquire the audio data output by the first external electronic device 302 using the audio input device 340.

According to one embodiment, the second external electronic device 303 may perform wireless communication with the electronic device 301 based on a specified application (e.g., a video call application). For example, the second external electronic device 303 may transmit the audio data to the electronic device 301 using the wireless communication circuit. The audio data transmitted by the second external electronic device 303 may be referred to as audio data input by the user of the second external electronic device 303. The electronic device 301 may transmit the audio data received from the second external electronic device 303 to the first external electronic device 302 via the wireless communication circuit 390.

According to one embodiment, the processor 320 may operate while being operatively connected to the memory 330, the audio input device 340, the audio processor 370, and/or the wireless communication circuit 390. For example, the processor 320 may process an audio data processing function provided by the electronic device 301 using information stored in the memory 330. The processor 320 may transmit and/or receive various data from the outside (e.g., the first external electronic device 302 and/or the second external electronic device 303) via the wireless communication circuit 390.

The memory 330 may store instructions that, when executed, cause the processor 320 to allow the electronic device 301 to perform various operations. According to one embodiment, the memory 330 may be operatively connected to the processor 320 and may transmit stored data to the processor 320 or store data transmitted from the processor 320. For example, the memory 330 may store parameters related to a data processing operation of the electronic device 301. According to one embodiment, the memory 330 may store various applications and/or an application manager required for the electronic device 301 to perform the audio data processing operation. For example, the memory 330 may store a recording application and/or a media application. The recording application may provide a function of recording a plurality of audio data. The media application may include the video call application. For example, the electronic device 301 may transmit and/or receive video data and/or the audio data with the second external electronic device 303 based on the video call application.

According to one embodiment, the audio input device 340 may acquire the various audio data from the outside (e.g., a user and/or the first external electronic device 302). At least some of operations performed by the audio input device 340 may be replaced with the description of the audio input interface 210 in FIG. 2 above. For example, the audio input device 340 may operate as a portion of the audio input interface 210 (or the input module 150 in FIG. 1) or as a device separate from the electronic device 301. For example, the processor 320 may acquire audio data corresponding to a voice (e.g., a user utterance) sensed from the outside (e.g., the user) using the audio input device 340. The audio input device 340 may include at least one microphone (e.g., a dynamic microphone, a condenser microphone, and/or a piezo microphone). The audio data acquired by the audio input device 340 may be referred to as data obtained by converting the voice received from the outside into an electrical signal. For example, the processor 320 may control the audio input device 340 to convert the sensed voice using an analog-to-digital conversion circuit and acquire the converted audio data. Referring to FIG. 3, it is shown that the audio input device 340 is included inside the electronic device 301, but the embodiments of the disclosure are not limited thereto. For example, the audio input device 340 may be located outside the electronic device 301 and may include a device (e.g., a microphone, a Bluetooth™ receiving circuit, or a USB circuit) for receiving audio or an audio signal. For example, the audio input device 340 may acquire a response signal output from the first external electronic device 302. The response signal may be referred to as a signal output by the first external electronic device 302 in response to a trigger signal received from the electronic device 301. As another example, the audio input device 340 may acquire second audio data output from the first external electronic device 302. The second audio data may be referred to as audio data output by the first external electronic device 302 in response to first audio data received from the electronic device 301.

According to one embodiment, the audio processor 370 (e.g., the audio signal processor 240 in FIG. 2) may perform various processing functions using the plurality of audio data. For example, the processor 320 may transmit the trigger signal generated while the electronic device 301 executes the specified application to the audio processor 370. As another example, the processor 320 may transmit the trigger signal to the first external electronic device 302 via the wireless communication circuit 390, then acquire the response signal corresponding to the trigger signal from the first external electronic device 302 using the audio input device 340, and then transmit the response signal to the audio processor 370. The audio processor 370 may compare the trigger signal and the acquired response signal with each other to calculate an echo path delay (EPD). The audio processor 370 may perform an echo canceling operation based on a calculated path delay (e.g., the echo path delay). The echo canceling operation may be referred to as, for example, an operation of removing an echo signal contained in the audio data. The electronic device 301 may further include a separate echo canceller in the audio processor 370 for the echo canceling operation. The electronic device 301 may remove echo generated while executing the specified application using the echo canceller. For example, the electronic device 301 may store reference data. Based on the reference data, the electronic device 301 may remove the echo contained in the audio data transmitted and/or received while executing the specified application. The audio processor 370 may perform an echo canceling function for the audio data received from the outside (e.g., the first external electronic device 302) and/or the audio data transmitted to the outside. In one embodiment, the audio processor 370 may perform various processing on the audio signal. For example, the audio processor 370 may perform at least some (e.g., the sampling rate changing, the application of one or more filters, the interpolation processing, the boosting or the attenuating of the entire or partial frequency band, the noise processing (e.g., the attenuating of the noise or the echo), the channel changing (e.g., switching between the mono and the stereo), the mixing, or the extracting of the specified signal) of the operations performed by the audio signal processor 240 in FIG. 2.

According to one embodiment, the wireless communication circuit 390 may perform an operation of electrically connecting the electronic device 301 to the outside (e.g., the first external electronic device 302 and/or the second external electronic device 303). The electronic device 301 may transmit or receive the audio data with the first external electronic device 302 and/or the second external electronic device 303 via the wireless communication circuit 390. For example, the electronic device 301 may transmit the trigger signal from the first external electronic device 302 via the wireless communication circuit 390. As another example, the electronic device 301 may receive the various audio data (e.g., audio data corresponding to an utterance input of the user of the second external electronic device 303) from the second external electronic device 303 via the wireless communication circuit 390. As another example, the electronic device 301 may transmit the audio data received from the second external electronic device 303 to the first external electronic device 302 via the wireless communication circuit 390. For example, the electronic device 301 may identify the path delay (e.g., a network path delay, an electrical path delay, and/or the echo path delay) that occurs while performing the wireless communication with the external electronic devices 302 and 303 via the wireless communication circuit 390. In other words, while the electronic device 301 transmits and/or receives the various data with the first external electronic device 302 and/or the second external electronic device 303 based on the wireless communication, the data may not be transmitted and/or received in real time. This may be defined as the network path delay and/or the echo path delay. The electronic device 301 may perform an operation to compensate for the path delay. For example, the electronic device 301 may calculate the echo path delay using the various data received by performing the wireless communication with the plurality of external electronic devices via the wireless communication circuit 390, and compensate for the path delay using the calculation result.

Referring to FIG. 3, the components included in the electronic device 301, the first external electronic device 302, and the second external electronic device 303 are shown, but the embodiments of the disclosure are not limited thereto. For example, the electronic device 301 may further include a display module (e.g., the display module 160 in FIG. 1) and/or a sensor module (e.g., the sensor module 176 in FIG. 1). For another example, the first external electronic device 302 and the second external electronic device 303 may include at least some of the components included in the electronic device 301.

Figure 4:
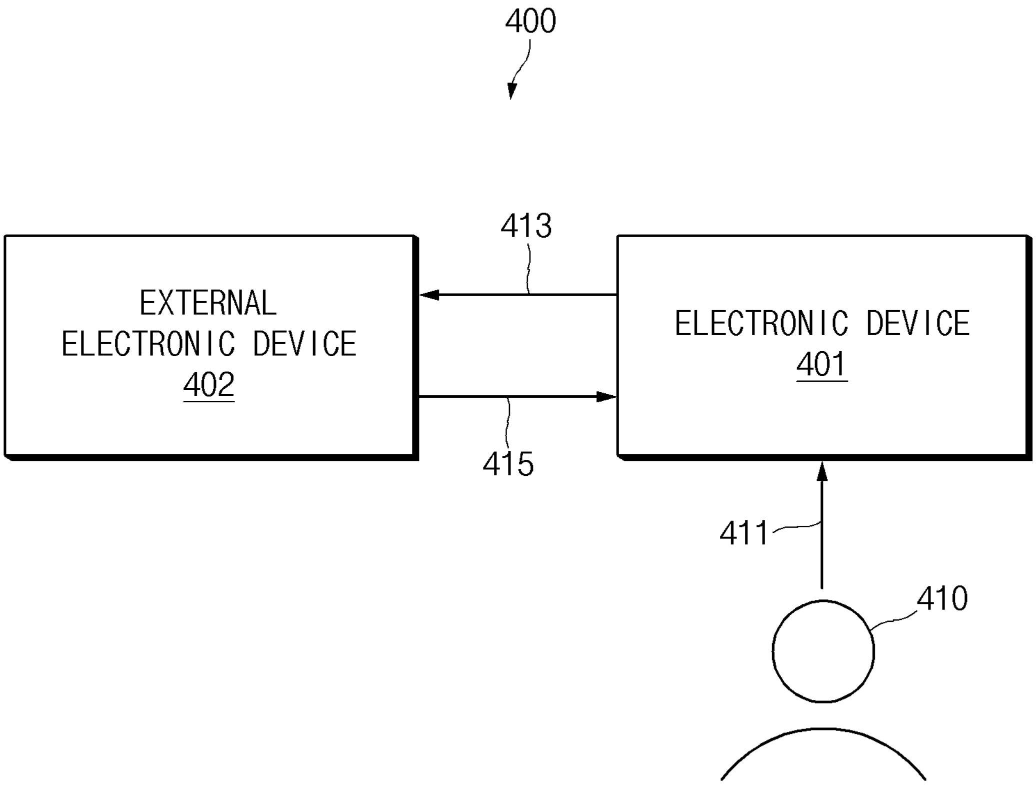
FIG. 4 shows a conceptual diagram of an audio data processing operation of an electronic device according to an embodiment of the disclosure.

FIG. 4 shows a conceptual diagram of an audio data processing operation of an electronic device according to an embodiment of the disclosure.

Referring to FIG. 4, according to one embodiment, conceptual diagram 400 illustrates that an electronic device 401 may transmit/receive various data with an external electronic device (e.g., the first external electronic device 302 in FIG. 3) or acquire 411 audio data from a user 410 while executing a specified application (e.g., the video call application). The electronic device 401 may transmit the audio data acquired from the user 410 to the outside (e.g., the second external electronic device 303 in FIG. 3) via a wireless communication circuit (e.g., the wireless communication circuit 390 in FIG. 3).

According to one embodiment, the electronic device 401 may generate a trigger signal when executing the specified application. The trigger signal may be referred to as a signal in an inaudible frequency band, but the embodiments of the disclosure may not be limited thereto and the trigger signal may be defined as a signal in a frequency band that may be acquired via the audio input device 340. For example, the electronic device 401 may generate the trigger signal and transmit 413 the generated trigger signal to an external electronic device 402 via the wireless communication circuit (e.g., the wireless communication circuit 390 in FIG. 3). The electronic device 401 may acquire 415 a response signal corresponding to the trigger signal from the external electronic device 402. For example, the electronic device 401 may acquire the response signal corresponding to the trigger signal from the external electronic device 402 using an audio input device (e.g., the audio input device 340 in FIG. 3) (e.g., the microphone). For example, the response signal may be referred to as a signal acquired as the external electronic device 402 outputs the trigger signal received from the electronic device 401 to the outside via an output device (e.g., the speaker).

According to one embodiment, the electronic device 401 may calculate an echo path delay by comparing the trigger signal and the response signal to each other. For example, the electronic device 401 may calculate an electrical path delay using an audio processor (e.g., the audio processor 370 in FIG. 3). The audio processor may be referred to as one component of the electronic device 401 including an EPD calculating module and an echo canceling module. The electronic device 401 may compare the trigger signal and the response signal to each other, and when it is determined that the trigger signal and the response signal are similar to each other as a result of the comparison, calculate the echo path delay. For example, the electronic device 401 may determine that the trigger signal and the response signal are similar to each other when it is determined that the trigger signal and the response signal correspond to the same type as a set audio data type. The electronic device 401 may determine whether an audio signal and/or audio data are similar to each other using an algorithm based on voice recognition (e.g., a voice trigger service). The electronic device 401 may compare the trigger signal and the response signal to each other using the echo path delay (EPD) calculating module, and transmit the echo path delay calculated as a result of the comparison and information related to the echo path delay to the echo canceling module. The electronic device 401 may remove echo contained in the response signal based on the calculated echo path delay using the echo canceling module.

According to one embodiment, the electronic device 401 may determine whether the audio signal and/or the audio data are similar to each other using an algorithm based on a mean squared difference similarity, a cosine similarity, a Pearson similarity, a Euclidean distance similarity, and/or a Jaccard similarity.

According to one embodiment, the electronic device 401 may receive first audio data using the wireless communication circuit from another external electronic device (e.g., the second external electronic device 303 in FIG. 3) except for the external electronic device 402 (e.g., the first external electronic device 302 in FIG. 3). The electronic device 401 may transmit the received first audio data to the external electronic device 402 and acquire second audio data using the audio input device. For example, the second audio data may be referred to as audio data acquired as the external electronic device 402 outputs the first audio data received from the electronic device 401 to the outside via the output device (e.g., the speaker). The electronic device 401 may compare the first audio data and the second audio data to each other using the audio processor to update the echo path delay and the information related to the echo path delay. The electronic device 401 may perform an echo canceling function based on the updated echo path delay while performing the wireless communication with the external electronic device 402.

According to one embodiment, the electronic device 401 may further include a sensor module (e.g., the sensor module 176 in FIG. 1). The electronic device 401 may acquire motion information of the electronic device 401 using at least one sensor included in the sensor module. For example, the electronic device 401 may acquire the motion information of the electronic device based on a specified period using the at least one sensor while executing the specified application (e.g., the video call application), and determine whether the motion information satisfies a specified condition. For example, when the motion information satisfies the specified condition, the electronic device 401 may determine that the echo path delay needs to be updated. In this case, the electronic device 401 may update the echo path delay using the audio processor based on the first audio data and the second audio data. The first audio data may correspond to audio data received from the outside (e.g., the second external electronic device 303 in FIG. 3) using the wireless communication circuit, and the second audio data may correspond to audio data output corresponding to the first audio data from the external electronic device 402. For example, the electronic device 401 may update the echo path delay when it is determined that the first audio data and the second audio data are similar to each other. A description of the operation for determining the similarity between the audio data may be replaced with the above description of the similarity determination operation.

Figure 5:
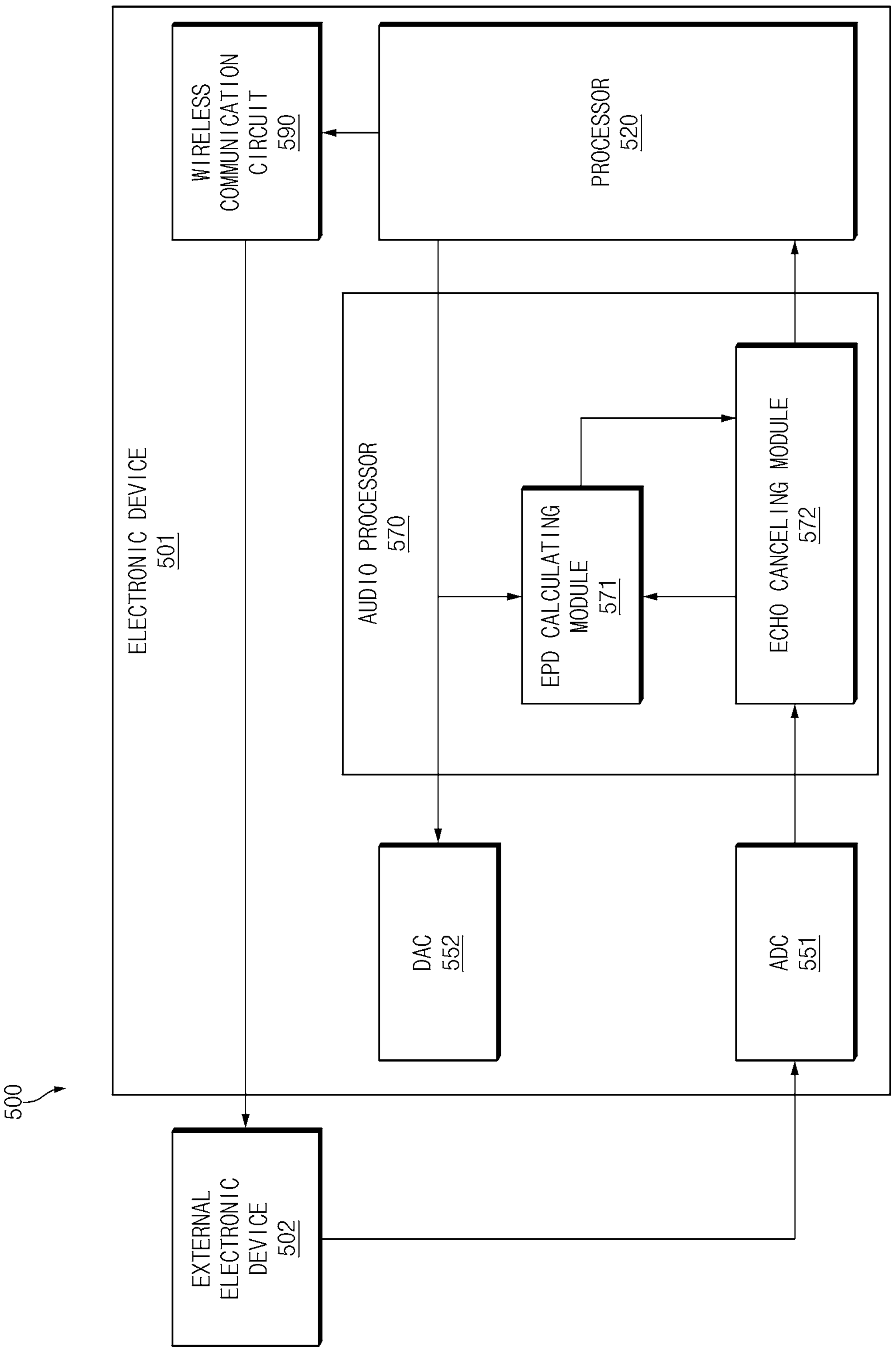
FIG. 5 shows a conceptual diagram of an audio data processing operation of an electronic device according to an embodiment of the disclosure.

FIG. 5 shows a conceptual diagram of an audio data processing operation of an electronic device according to an embodiment of the disclosure.

Referring to FIG. 5, according to one embodiment, conceptual diagram 500 illustrates that an electronic device 501 (e.g., the electronic device 301 in FIG. 3) may transmit/receive various audio data with an external electronic device 502 (e.g., the first external electronic device 302 in FIG. 3). The electronic device 501 may perform a data processing operation (e.g., the echo canceling) on the various audio data using an audio processor 570 (e.g., the audio processor 370 in FIG. 3).

According to one embodiment, the electronic device 501 may generate audio data and/or an audio signal to the external electronic device 502. For example, when executing a specified application (e.g., the video call application), the electronic device 501 may transmit a trigger signal to the external electronic device 502 via a wireless communication circuit 590 (e.g., the wireless communication circuit 390 in FIG. 3). The electronic device 501 may transmit first audio data received from the outside (e.g., the second external electronic device 303 in FIG. 3) to the external electronic device 502 using the wireless communication circuit 590 while executing the application. As another example, the electronic device 501 may transmit the trigger signal and/or the first audio data to the audio processor 570. The first audio data may be referred to as voice input data of an external user received during the application execution process from external electronic devices other than the external electronic device 502. For example, when executing the specified application, the electronic device 501 may control a processor 520 (e.g., the processor 320 in FIG. 3) to generate the trigger signal, transmit the generated trigger signal to the external electronic device 502 via the wireless communication circuit 590, and transmit the trigger signal to an echo path delay (EPD) calculating module 571 included in the audio processor 570. The trigger signal transmitted to the audio processor 570 may be transmitted to a DAC 552 (e.g., the DAC 250 in FIG. 2). The electronic device 501 may not externally output the trigger signal transmitted to the DAC 552, but the embodiments of the disclosure may not be limited thereto.

According to one embodiment, the electronic device 501 may acquire the various audio data output from the external electronic device 502. The audio data and/or the audio signals acquired from the external electronic device 502 may be transmitted to the audio processor 570 via an ADC 551 (e.g., the ADC 230 in FIG. 2). For example, the electronic device 501 may acquire a response signal output from the external electronic device 502 using an audio input device (e.g., the audio input device 340 in FIG. 3) (e.g., the microphone). The response signal may be referred to as a signal externally output by the external electronic device 502 in response to the reception of the trigger signal. For another example, the electronic device 501 may acquire second audio data output from the external electronic device 502 using the audio input device. The second audio data may be referred to as audio data externally output by the external electronic device 502 in response to the reception of the first audio data.

According to one embodiment, the electronic device 501 may calculate an echo path delay by comparing the plurality of audio data and/or audio signals to each other using the audio processor 570. For example, the electronic device 501 may compare the trigger signal and the response signal to each other using the EPD calculating module 571 included in the audio processor 570. The EPD calculating module 571 may transmit the echo path delay calculated as a result of the comparison and information related to the echo path delay to an echo canceling module 572. The echo canceling module 572 may remove echo generated during a process of performing wireless communication with the external electronic device 502 based on the received echo path delay and information related to the echo path delay. For example, the echo canceling module 572 may remove echo contained in the response signal based on the calculated echo path delay. As another example, the electronic device 501 may compare the first audio data and the second audio data to each other using the EPD calculating module 571. Echo path delay calculated by comparing the first audio data and the second audio data to each other may be different from the echo path delay calculated as the result of comparison between the trigger signal and the response signal.

According to one embodiment, the electronic device 501 may selectively calculate the echo path delay based on the plurality of audio data and/or the plurality of audio signals when a specified condition is satisfied. For example, the electronic device 501 may calculate the echo path delay when it is determined that the trigger signal and the response signal or the first audio data and the second audio data are similar to each other. The electronic device 501 may compare the plurality of audio data and/or the plurality of audio signals to each other based on a set audio data type, and calculate the echo path delay when it is determined that they correspond to the same type as at least some of the set audio data types.

The components of the electronic device 501 shown in FIG. 5 are illustrative, and the embodiments of the disclosure are not limited thereto. For example, the electronic device 501 may further include a sensor module (e.g., the sensor module 176 in FIG. 1). The electronic device 501 may acquire motion information of the electronic device 501 using at least one sensor included in the sensor module while executing the specified application. For example, the electronic device 501 may control the sensor module to acquire the motion information based on a specified period, and determine whether the motion information satisfies a specified condition. For example, when the motion information satisfies the specified condition, the electronic device 501 may update the echo path delay based on at least some of audio data received from the outside (e.g., the second external electronic device 303 in FIG. 3) and/or audio data transmitted to the outside. The specified condition may include a movement time, a movement distance, a movement direction, and/or a movement intensity of the electronic device 501. For example, when a distance between the electronic device 501 and the external electronic device 502 exceeds a specified distance (e.g., 30 centimeters (cm)), the electronic device 501 may determine that the specified condition is satisfied. For example, when the electronic device 501 moves for a time period greater than a specified time (e.g., 1 millisecond), the electronic device 501 may determine that the specified condition is satisfied.

Figure 6:
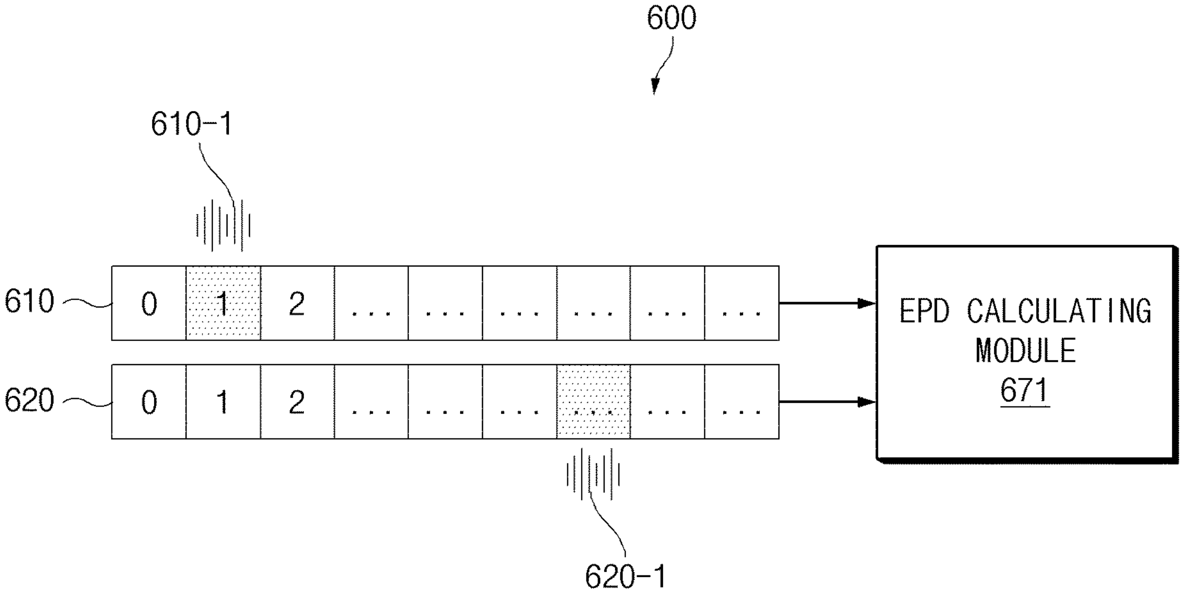
FIG. 6 shows a conceptual diagram of an audio data processing operation of an electronic device according to an embodiment of the disclosure.

FIG. 6 shows a conceptual diagram of an audio data processing operation of an electronic device according to an embodiment of the disclosure.

Referring to FIG. 6, according to one embodiment, conceptual diagram 600 illustrates that an electronic device (e.g., the electronic device 101 in FIG. 1) may determine a degree of similarity between a plurality of audio data. For example, the electronic device may identify index locations of the audio data transmitted and/or received via a plurality of buffers (e.g., first buffer 610 and second buffer 620) and determine the degree of similarity between the audio data stored in the identified locations.

According to one embodiment, the electronic device may identify audio data included in the first buffer 610 and the second buffer 620. For example, the electronic device may identify that first audio data 610-1 is stored in a first index of the first buffer 610. For example, the first audio data 610-1 may be referred to as audio data received by the electronic device from an external electronic device (e.g., the second external electronic device 303 in FIG. 3) via a wireless communication circuit (e.g., the wireless communication circuit 390 in FIG. 3). For another example, the electronic device may identify that a second audio data 620-1 is stored in an n-th index of the second buffer 620. For example, the second audio data 620-1 may be referred to as audio data output by the external electronic device corresponding to the first audio data 610-1 after the electronic device transmits the first audio data 610-1 to the external electronic device (e.g., the first external electronic device 302 in FIG. 3).

According to one embodiment, the electronic device may compare the first audio data 610-1 and the second audio data 620-1 to each other to determine whether they are similar to each other. For example, the electronic device may classify the audio data based on set types and determine whether the first audio data 610-1 and the second audio data 620-1 correspond to audio data of the same type. For example, the electronic device may classify the types of the audio data based on a voice frequency band of the same user, and perform, based on the classification, a similarity determination operation based on whether the plurality of audio data correspond to the audio data of the same type. When it is determined that the first audio data 610-1 and the second audio data 620-1 are substantially the same, the electronic device may calculate an echo path delay based on the two data using an EPD calculating module 671.

Figure 7:
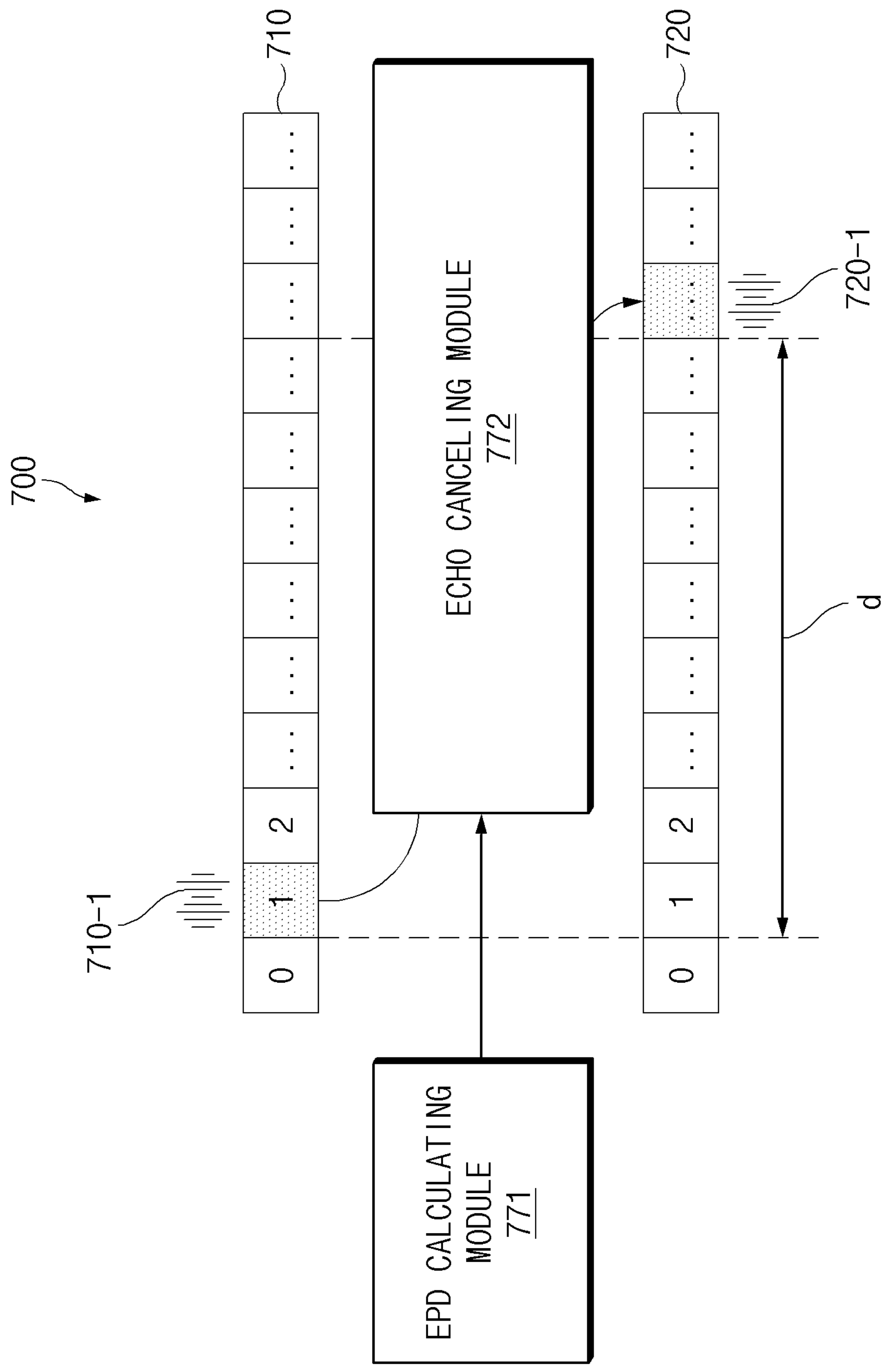
FIG. 7 shows a conceptual diagram of an audio data processing operation of an electronic device according to an embodiment of the disclosure.

FIG. 7 shows a conceptual diagram of an audio data processing operation of an electronic device according to an embodiment of the disclosure.

Referring to FIG. 7, according to one embodiment, conceptual diagram 700 illustrates that an electronic device (e.g., the electronic device 101 in FIG. 1) may remove echo contained in audio data. For example, the electronic device may perform an operation of removing echo of specific audio data based on an echo path delay calculated using an EPD calculating module 771.

According to one embodiment, the electronic device may identify first audio data 710-1 (e.g., the first audio data 610-1 in FIG. 6) included in a first buffer 710 (e.g., the first buffer 610 in FIG. 6) and second audio data 720-1 included in a second buffer 720 (e.g., the second buffer 620 in FIG. 6). As described above in the description of FIG. 6, the electronic device may calculate an echo path delay "d" using the EPD calculating module 771. For example, the echo path delay may be referred to as a buffer index difference between the first audio data 710-1 and the second audio data 720-1.

According to one embodiment, the electronic device may transmit the echo path delay "d" calculated using the EPD calculating module 771 to an echo canceling module 772. The echo canceling module 772 may perform an echo canceling function based on the received echo path delay "d." For example, the echo canceling module 772 may receive the echo path delay "d", and determine that an echo delay for a specified time period has occurred between the first audio data 710-1 and the second audio data 720-1. Accordingly, the echo canceling module 772 may remove echo contained in the second audio data 720-1 based on the echo path delay "d."

The description of the echo canceling operation shown in FIG. 7 is illustrative, and the embodiments of the disclosure are not limited thereto. For example, the electronic device may calculate the echo path delay based on various audio data transmitted and/or received in a process in which the electronic device communicates with an external electronic device (e.g., the first external electronic device 302 and/or the second external electronic device 303 in FIG. 3) as well as the first audio data and the second audio data, and perform the echo canceling function.

Figure 8:
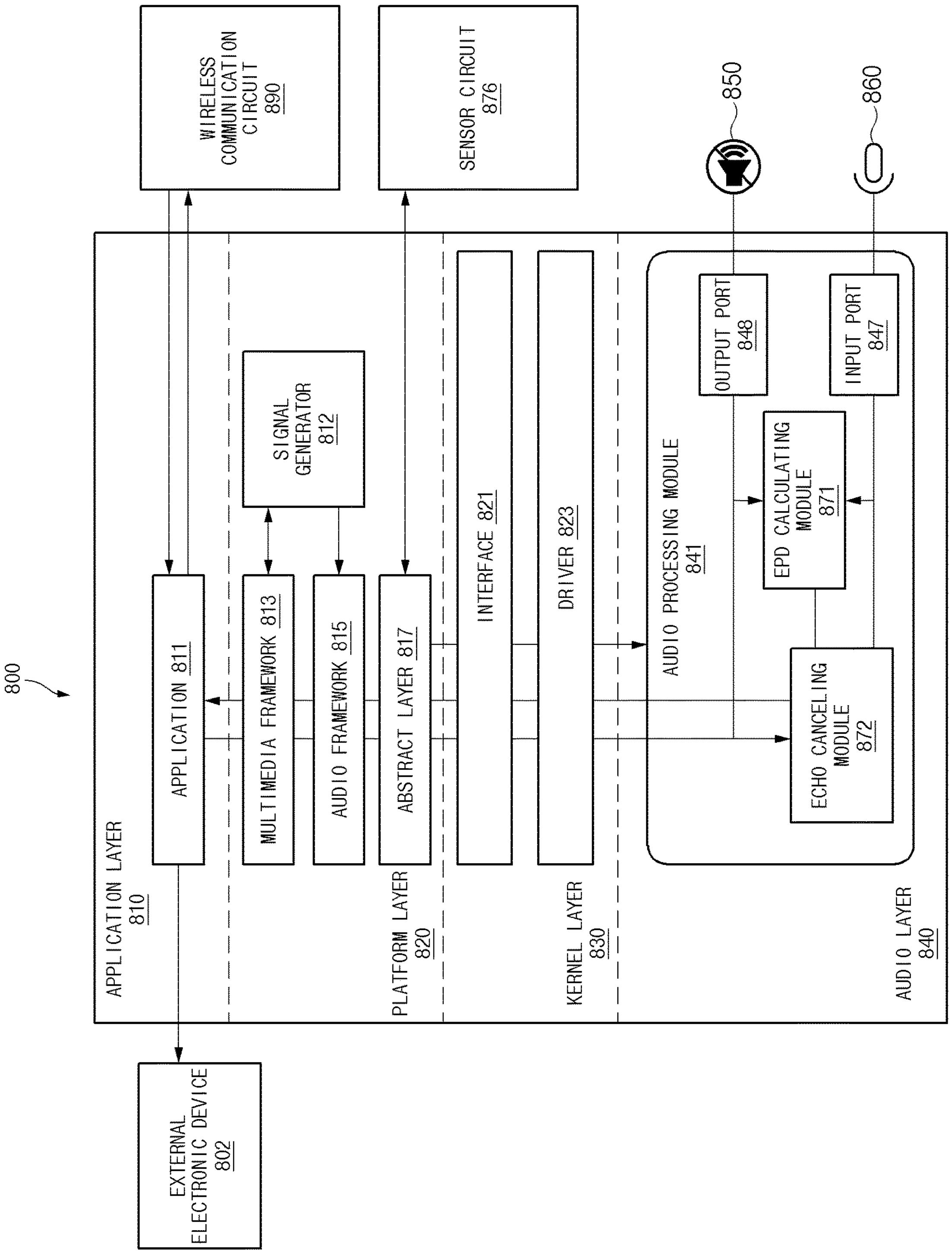
FIG. 8 shows a software structural diagram of an electronic device according to an embodiment of the disclosure.

FIG. 8 shows a software structural diagram of an electronic device according to an embodiment of the disclosure.

Referring to FIG. 8, according to one embodiment, software structural diagram 800 illustrates that a processor (e.g., the processor 320 in FIG. 3) may load a program (e.g., the program 140 in FIG. 1) including an application layer 810, a platform layer 820, a kernel layer 830, and/or an audio layer 840 into a memory (e.g., the memory 130 in FIG. 1) and execute the program. The application layer 810, the platform layer 820, and the kernel layer 830 may be executed and/or implemented by a main processor (e.g., the main processor 121 in FIG. 1 and/or the processor 320 in FIG. 3), and the audio layer 840 may be executed and/or implemented by an auxiliary processor (e.g., the auxiliary processor 123 in FIG. 1 and/or the audio processor 370 in FIG. 3). For example, the auxiliary processor may be a digital signal processor (DSP). The main processor and the auxiliary processor may be included on the same application processor chip (AP chip).

The division of the layers based on the description of FIG. 8 above may mean a software layer that functionally or logically divides at least a portion of the program loaded into the memory from each other.

According to one embodiment, the application layer 810, the platform layer 820, the kernel layer 830, and/or the audio layer 840 may be loaded into specified memory address spaces in the memory, respectively. According to one embodiment, audio stream data generated (or loaded) in a memory space of the application layer 810, the platform layer 820, and the kernel layer 830 by the main processor may be moved (e.g., copied) to a memory space of the audio layer 840 based on a direct memory access (DMA) scheme (e.g., under control of a DMA controller included in an application processor). According to another embodiment, the layer division shown in FIG. 8 may be a layer division determined by a logical memory address of the memory controlled and/or managed by the main processor or the auxiliary processor.

According to one embodiment, the audio stream data generated (or loaded) by the main processor may be moved (e.g., copied) to the memory space of the audio layer 840 based on various communication schemes (e.g., a shared memory IPC communication scheme) via a shared memory allocated to the memory.

According to one embodiment, the main processor or the application layer 810 may include an application 811. For example, the main processor or the application 811 may mean an application (e.g., a recording application or a media application) for controlling functions (e.g., an audio playback activation function, an audio playback inactivation function, an audio equalizer function, an audio volume adjustment function, an audio playback control function, and/or an audio playback function) related to processing of the audio data. The application 811 may provide a user interface allowing a user to control the functions related to the audio data processing. For example, the application 811 may include the recording application that acquires the audio data from the outside (e.g., the user and/or an external electronic device 802 (e.g., the first external electronic device 302 in FIG. 3) via at least one input device (e.g., the microphone, a Bluetooth™ device, and/or a USB) and/or the media application (e.g., the video call application) that transmits the audio data and/or video data acquired via the input device (e.g., the input module 150 in FIG. 1) to the outside and receive the audio data and/or the video data from the outside. The electronic device may transmit and/or receive various audio data with the external electronic device 502 via a wireless communication circuit 890 (e.g., the communication module 190 in FIG. 1 or the wireless communication circuit 390 in FIG. 3).

According to one embodiment, the main processor or the platform layer 820 may include a signal generator 812, a multimedia framework 813, an audio framework 815, and an abstract layer 817 (e.g., an audio hardware abstract layer). For example, the signal generator 812 may generate various signals (e.g., a trigger signal) and transmit the signals to the outside. For example, when the electronic device executes a specified application (e.g., the video call application), the signal generator 812 may generate the trigger signal and transmit the trigger signal to the multimedia framework 813 and/or the audio framework 815. For example, the multimedia framework 813 may transmit information on the audio data and/or an audio signal to the audio framework 815. For example, the multimedia framework 813 may transmit information on a stream type of the audio data or a type (e.g., a speaker, a headset, and/or a microphone) of an audio module (e.g., the audio module 170 in FIG. 1) to the audio framework 815.

According to one embodiment, the main processor or the abstract layer 817 may manage an abstracted layer between hardware (e.g., the audio input device 340 in FIG. 3), the application 811, the multimedia framework 813, and/or the audio framework 815. The main processor or the abstract layer 817 may receive a control signal (e.g., the trigger signal) transmitted by the audio framework 815 and transmit the received control signal to an interface 821 and an audio driver 823. For example, the main processor or the abstract layer 817 may identify audio data determined to be transmitted from the application 811 to an audio processor (e.g., the audio processor 370 in FIG. 3), and transmit information related to the audio data (e.g., a type of the audio data and/or an audio data processing path) to the kernel layer 830. For example, the abstract layer 817 may receive motion information of the electronic device from a sensor circuit 876 (e.g., the sensor module 176 in FIG. 1). The abstract layer 817 may transmit the received motion information to the kernel layer 830. The electronic device may determine whether the motion information satisfies a specified condition. The specified condition may be referred to as, for example, a separation distance (e.g., 30 cm to 150 cm) between the electronic device and the external electronic device 802.

According to one embodiment, the main processor or the interface 821 may transfer the control signal transmitted from the platform layer 820 to the kernel layer 830. For example, the interface 821 may be one component referred to as an advanced linux sound architecture (ALSA).

According to one embodiment, the main processor or the audio driver 823 may control an audio input device or an audio output device. For example, the audio driver 823 may control the hardware (e.g., the audio input device 340 in FIG. 3) that acquires the audio data from the outside (e.g., the external electronic device 802). As another example, the audio driver 823 may receive the control signal transmitted from the abstract layer 817 and control hardware that outputs audio based on the control signal. As another example, the audio driver 823 may control hardware (e.g., an input port 847, an output port 848, an EPD calculating module 871, and/or an echo canceling module 872) operating at the audio layer 840.

According to one embodiment, the audio layer 840 may be referred to as a software layer implemented in the auxiliary processor (e.g., the auxiliary processor 123 in FIG. 1 and/or the audio processor 370 in FIG. 3). For example, the audio layer 840 may be referred to as a software layer implemented in the audio processor in FIG. 3 and controlling the audio processor. For example, the audio layer 840 may perform various operations for processing the audio data acquired using an audio input device 860 (e.g., the audio input device 340 in FIG. 3) and transmitting the processed audio data to the application 811. For another example, the audio layer 840 may perform various operations for processing an audio stream transmitted from the platform layer 820 and outputting the audio stream to an audio output device 850. For example, the audio layer 840 may be composed of the input port 847, the output port 848, the EPD calculating module 871, and/or the echo canceling module 872 included in an audio processing module 841.

According to one embodiment, the audio processing module 841 may include the input port 847 and the output port 848. For example, the input port 847 may include a physical terminal that receives data acquired by and transmitted from the audio input device 860 (e.g., the audio input device 340 in FIG. 3) or a space (e.g., an address on the memory) in the memory (e.g., the memory 130 in FIG. 1) in which the data transmitted from the audio input device 860 is recorded. For example, the input port 847 may include a physical terminal connected to the space in the memory whose value is changed in association with the data transmitted from the audio input device 860. As another example, the output port 848 may include a physical terminal that outputs the audio data to the audio output device 850 or a space in the memory in which data transmitted from the auxiliary processor is recorded. For example, the output port 848 may include a physical terminal whose current and/or voltage values are changed in association with values in the memory space. It is shown in FIG. 8 that the electronic device includes only one input port 847 and one output port 848, but the embodiments of the disclosure are not limited thereto. For example, the electronic device may include the plurality of audio input devices 860, and may further include the plurality of input ports 847 corresponding to the audio input devices 860 in number.

According to one embodiment, the audio processing module 841 may include the EPD calculating module 871 and the echo canceling module 872. For example, the EPD calculating module 871 may calculate an echo path delay based on the plurality of audio data and/or the plurality of audio signals. The EPD calculating module 871 may transmit the calculated echo path delay to the echo canceling module 872. For example, the echo canceling module 872 may remove echo contained in the audio data based on the received echo path delay. Descriptions of the echo path delay calculation operation of the EPD calculating module 871 and the echo canceling operation of the echo canceling module 872 may be replaced with the descriptions of FIGS. 3 to 7 above.

According to one embodiment of the disclosure, an electronic device may include a wireless communication circuit, a microphone, an audio processor, a processor, and a memory operatively connected to the processor. The memory may store instructions that, when executed, cause the processor to transmit a trigger signal to the audio processor when a specified application is executed, transmit the trigger signal to an external electronic device via the wireless communication circuit, acquire a response signal corresponding to the trigger signal from the external electronic device using the microphone, compare the trigger signal and the acquired response signal to each other to calculate an echo path delay using the audio processor, and perform an echo canceling operation based on the calculated echo path delay.

According to one embodiment, the audio processor may include an echo path delay (EPD) calculating module and an echo canceling module, and the instructions, when executed, may cause the processor to compare the trigger signal and the response signal to each other using the EPD calculating module, transmit information related to the echo path delay calculated as a result of the comparison to the echo canceling module, and eliminate echo contained in the response signal based on the echo path delay using the echo canceling module.

According to one embodiment, the instructions, when executed, may cause the processor to transmit first audio data received while executing the application using the wireless communication circuit to the audio processor and the external electronic device, acquire second audio data corresponding to the first audio data and output from the external electronic device using the microphone, and update the echo path delay by comparing the first audio data and the second audio data to each other using the audio processor.

According to one embodiment, the instructions, when executed, may cause the processor to compare the trigger signal and the response signal to each other using the audio processor, and calculate the echo path delay when it is determined that the trigger signal and the response signal are similar to each other as a result of the comparison.

According to one embodiment, the instructions, when executed, may cause the processor to determine that the trigger signal and the response signal are similar to each other using the audio processor when it is determined that the trigger signal and the response signal correspond to the same type as a set audio data type.

According to one embodiment, the electronic device may further include at least one sensor, and the instructions, when executed, may cause the processor to acquire motion information of the electronic device based on a specified period using the at least one sensor while executing the application, and determine whether the motion information satisfies a specified condition.

According to one embodiment, the instructions, when executed, may cause the processor to update the echo path delay using the audio processor based on first audio data and second audio data when the motion information satisfies the specified condition.

According to one embodiment, the first audio data may correspond to audio data received using the wireless communication circuit, and the second audio data may correspond to audio data output corresponding to the first audio data from the external electronic device.

According to one embodiment, the instructions, when executed, may cause the processor to compare the first audio data and the second audio data to each other using the audio processor, and update the echo path delay when it is determined that the first audio data and the second audio data are similar to each other as a result of the comparison.

According to one embodiment, the instructions, when executed, may cause the processor to determine that the first audio data and the second audio data are similar to each other using the audio processor when it is determined that the first audio data and the second audio data correspond to the same type as at least a portion of the first audio data.

According to one embodiment of the disclosure, a method for an electronic device to process audio data may include transmitting a trigger signal to an audio processor when a specified application is executed, transmitting the trigger signal to an external electronic device via a wireless communication circuit, acquiring a response signal corresponding to the trigger signal from the external electronic device using a microphone, calculating an echo path delay by comparing the trigger signal and the acquired response signal to each other using the audio processor, and performing an echo canceling function based on the calculated echo path delay.

According to one embodiment, the method may further include comparing the trigger signal and the response signal to each other using an EPD calculating module included in the audio processor, transmitting information related to the echo path delay calculated as a result of the comparison to an echo canceling module included in the audio processor, and removing echo contained in the response signal based on the echo path delay using the echo canceling module.

According to one embodiment, the method may further include transmitting first audio data received using the wireless communication circuit while executing the application to the audio processor and the external electronic device, acquiring second audio data corresponding to the first audio data and output from the external electronic device using the microphone, and updating the echo path delay by comparing the first audio data and the second audio data to each other using the audio processor.

According to one embodiment, the calculating of the echo path delay by comparing the trigger signal and the acquired response signal to each other using the audio processor may include comparing the trigger signal and the response signal to each other using the audio processor, and calculating the echo path delay when it is determined that the trigger signal and the response signal are similar to each other as a result of the comparison.

According to one embodiment, the comparing of the trigger signal and the response signal to each other using the audio processor, and calculating of the echo path delay when it is determined that the trigger signal and the response signal are similar to each other as the result of the comparison may include determining that the trigger signal and the response signal are similar to each other using the audio processor when it is determined that the trigger signal and the response signal correspond to the same type as a set audio data type.

According to one embodiment, the method may further include acquiring motion information of the electronic device based on a specified period using at least one sensor while executing the application, and determining whether the motion information satisfies a specified condition.

According to one embodiment, the method may further include updating the echo path delay using the audio processor based on first audio data and second audio data when the motion information satisfies the specified condition.

According to one embodiment, the first audio data may correspond to audio data received using the wireless communication circuit, and the second audio data may correspond to audio data output corresponding to the first audio data from the external electronic device.

According to one embodiment, the updating of the echo path delay using the audio processor based on the first audio data and the second audio data when the motion information satisfies the specified condition may further include comparing the first audio data and the second audio data to each other using the audio processor, and updating the echo path delay when it is determined that the first audio data and the second audio data are similar to each other as a result of the comparison.

According to one embodiment, the comparing of the first audio data and the second audio data to each other using the audio processor, and the updating of the echo path delay when it is determined that the first audio data and the second audio data are similar to each other as the result of the comparison may include determining that the first audio data and the second audio data are similar to each other using the audio processor when it is determined that the first audio data and the second audio data correspond to the same type as at least a portion of the first audio data.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
- a wireless communication circuit;
- a microphone;
- an audio processor;
- memory, comprising one or more storage media, storing instructions; and
- at least one processor communicatively coupled to the wireless communication circuit, the microphone, the audio processor, and the memory,
- wherein the instructions, when executed by the at least one processor individually or collectively, cause the electronic device to:
  - in response to a specified application being executed, transmit, to the audio processor, a trigger signal,
  - transmit, to a first external electronic device via the wireless communication circuit, the trigger signal,
  - acquire, from the first external electronic device by using the microphone, a response signal corresponding to the trigger signal,
  - compare the trigger signal and the response signal to calculate an echo path delay by using the audio processor,
  - transmit, to the first external electronic device via the wireless communication circuit, first audio data received from a second external electronic device while the specified application is being executed,
  - acquire input audio data using the microphone, the input audio data including second audio data corresponding to the first audio data that is output from the first external electronic device,
  - based on the echo path delay, perform an echo canceling operation to remove an echo corresponding to the second audio data output by the first external electronic device from the input audio data, and
  - transmit the input audio data, from which the echo has been removed, to the second external electronic device.

2. The electronic device of claim 1,
- wherein the audio processor includes echo path delay (EPD) calculating circuitry and echo canceling circuitry,
- wherein the instructions, when executed by the at least one processor individually or collectively, further cause the electronic device to:
  - compare the trigger signal and the response signal by using the EPD calculating circuitry,
  - transmit, to the echo canceling circuitry, information related to the echo path delay calculated as a result of the comparison, and
  - based on the echo path delay, remove the echo contained in the input audio data by using the echo canceling circuitry.

3. The electronic device of claim 1, wherein the instructions, when executed by the at least one processor individually or collectively, further cause the electronic device to:
- transmit, to the audio processor, the first audio data,
- identify the second audio data from the input audio data, and
- update the echo path delay by comparing the first audio data and the second audio data by using the audio processor.

4. The electronic device of claim 1, wherein the instructions, when executed by the at least one processor individually or collectively, further cause the electronic device to:
- compare the trigger signal and the response signal by using the audio processor, and
- in response to determining that the trigger signal and the response signal are similar to each other as a result of the comparison, calculate the echo path delay.

5. The electronic device of claim 4, wherein the instructions, when executed by the at least one processor individually or collectively, further cause the electronic device to:
- determine that the trigger signal and the response signal are similar to each other by using the audio processor based on determining that the trigger signal and the response signal correspond to a same type as a set audio data type.

6. The electronic device of claim 1, further comprising:
- at least one sensor,
- wherein the instructions, when executed by the at least one processor individually or collectively, further cause the electronic device to:
  - acquire motion information of the electronic device based on a specified period by using the at least one sensor while executing the specified application, and
  - determine whether the motion information satisfies a specified condition.

7. The electronic device of claim 6, wherein the instructions, when executed by the at least one processor individually or collectively, further cause the electronic device to:
- in response to determining that the motion information satisfies the specified condition, update the echo path delay by using the audio processor based on first audio data and second audio data.

8. The electronic device of claim 7, wherein the instructions, when executed by the at least one processor individually or collectively, further cause the electronic device to:
- compare the first audio data and the second audio data by using the audio processor, and
- update the echo path delay based on determining that the first audio data and the second audio data are similar to each other as a result of the comparison.

9. The electronic device of claim 8, wherein the instructions, when executed by the at least one processor individually or collectively, further cause the electronic device to:
- determine that the first audio data and the second audio data are similar to each other by using the audio processor based on determining that the second audio data correspond to a same type as at least a portion of the first audio data.

10. The electronic device of claim 1, wherein the specified application includes a call application.

11. A method for an electronic device to provide a function of processing audio data, the method comprising:
in response to a specified application being executed, transmitting, to an audio processor, a trigger signal;
transmitting, to a first external electronic device via a wireless communication circuit, the trigger signal;
acquiring, from the first external electronic device by using a microphone, a response signal corresponding to the trigger signal;
calculating an echo path delay by comparing the trigger signal and the response signal by using the audio processor;
transmitting, to the first external electronic device via the wireless communication circuit, first audio data received from a second external electronic device while the specified application is being executed;
acquiring input audio data using the microphone, the input audio data including second audio data corresponding to the first audio data that is output from the first external electronic device;
based on the echo path delay, performing an echo canceling function to remove an echo corresponding to the second audio data output by the first external electronic device from the input audio data; and
transmitting the input audio data, from which the echo has been removed, to the second external electronic device.

12. The method of claim 11, further comprising:
comparing the trigger signal and the response signal by using echo path delay (EPD) calculating circuitry included in the audio processor;
transmitting, to echo canceling circuitry included in the audio processor, information related to the echo path delay calculated as a result of the comparison; and
based on the echo path delay, removing the echo contained in the input audio data by using the echo canceling circuitry.

13. The method of claim 11, further comprising:
transmitting, to the audio processor, the first audio data;
identifying the second audio data from the input audio data; and
updating the echo path delay by comparing the first audio data and the second audio data by using the audio processor.

14. The method of claim 11, wherein the calculating of the echo path delay by comparing the trigger signal and the acquired response signal by using the audio processor comprises:
comparing the trigger signal and the response signal by using the audio processor; and
calculating the echo path delay in response to determining that the trigger signal and the response signal are similar to each other as a result of the comparison.

15. The method of claim 14, wherein the comparing of the trigger signal and the response signal by using the audio processor, and the calculating of the echo path delay in response to determining that the trigger signal and the response signal are similar to each other as the result of the comparison comprises:
determining that the trigger signal and the response signal are similar to each other by using the audio processor based on determining that the trigger signal and the response signal correspond to a same type as a set audio data type.

16. The method of claim 11, further comprising:
acquiring motion information of the electronic device based on a specified period by using at least one sensor while executing the specified application; and
determining whether the motion information satisfies a specified condition.

17. The method of claim 16, further comprising:
in response to determining that the motion information satisfies the specified condition, updating the echo path delay by using the audio processor based on first audio data and second audio data.

18. The method of claim 17, wherein the updating of the echo path delay by using the audio processor based on the first audio data and the second audio data comprises:
comparing the first audio data and the second audio data by using the audio processor; and
updating the echo path delay based on determining that the first audio data and the second audio data are similar to each other as a result of the comparison.

19. The method of claim 18, wherein the comparing of the first audio data and the second audio data by using the audio processor, and the updating of the echo path delay based on determining that the first audio data and the second audio data are similar to each other as the result of the comparison comprises:
determining that the first audio data and the second audio data are similar to each other by using the audio processor based on determining that the second audio data correspond to a same type as at least a portion of the first audio data.

20. The method of claim 11, wherein the specified application includes a call application.

* * * * *